No. 661,684. Patented Nov. 13, 1900.
A. BALL & T. OFFICER.
ROCK DRILL CYLINDER HEAD.
(Application filed June 20, 1899.)
(No Model.)
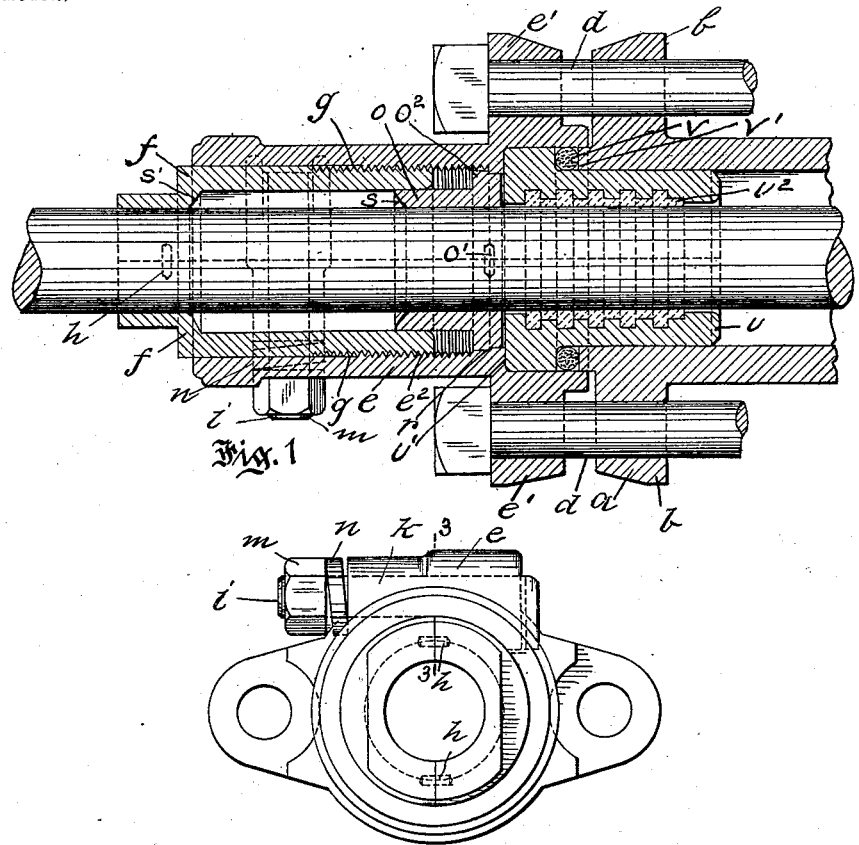
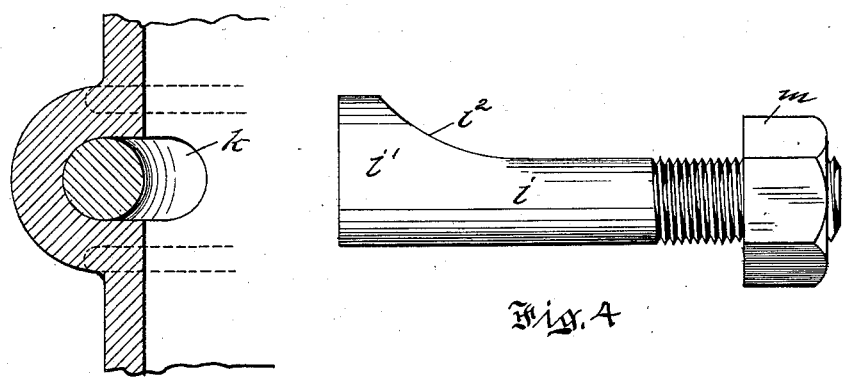
Witnesses
Lindsay deB. Little
Walter Samariss
Inventors
Albert Ball
and Thomas Officer
By Kay & Totten
Attorneys

United States Patent Office.

ALBERT BALL AND THOMAS OFFICER, OF CLAREMONT, NEW HAMPSHIRE, ASSIGNORS TO THE SULLIVAN MACHINERY COMPANY, OF SAME PLACE AND CHICAGO, ILLINOIS.

ROCK-DRILL CYLINDER-HEAD.

SPECIFICATION forming part of Letters Patent No. 661,684, dated November 13, 1900.

Application filed June 20, 1899. Serial No. 721,215. (No model.)

*To all whom it may concern:*

Be it known that we, ALBERT BALL and THOMAS OFFICER, residents of Claremont, in the county of Sullivan and State of New Hampshire, have invented a new and useful Improvement in Rock-Drill Cylinder-Heads; and we do hereby declare the following to be a full, clear, and exact description thereof.

Our invention relates to cylinder-heads for rock-drill and like machines.

The main object of our invention is to provide a cylinder-head in which the packing is securely held in place and yet readily inspected when desired or entirely removed without inconvenience.

To these ends our invention comprises the novel features hereinafter set forth and claimed.

To enable others skilled in the art to make and use our invention, we will describe the same more fully, referring to the accompanying drawings, in which—

Figure 1 is a longitudinal section of a portion of the lower end of a cylinder of a suitable rock-drill with our invention applied thereto. Fig. 2 is an end view of the same. Fig. 3 is a section on the line 3 3, Fig. 2. Fig. 4 is a view of the retaining-bolt for securing the bushing in place.

Like letters of reference indicate like parts in each of the views.

The letter $a$ designates the lower end of the cylinder of a suitable rock-drill having the lugs $b$, through which the rods $d$ pass, which secure the cylinder head or shell $e$ to said cylinder. Accordingly said cylinder-head $e$ has the lugs $e'$, corresponding to the lugs $b$ and through which the rods $d$ pass.

The inner face of the shell $e$ is threaded, as at $e^2$. A partible gland or bushing $f$ has the threads $g$, adapted to engage the threaded portion $e^2$ of the shell $e$. The two parts of the gland or bushing $f$ are secured together at the lower ends by dowel-pins, which pass through openings $h$. In order to retain the gland $f$ securely in position, we employ the bolt $i$. This bolt $i$ fits within the opening $k$ in the shell $e$, and the said bolt has the oblong head $i'$, which is slightly curved, as at $i^2$, to correspond with the curve of the exterior surface of the gland $f$. The opposite end of the bolt $i$ is threaded, and a nut $m$ engages therewith. The said bolt $i$ acts on the principle of a wedge, for when said bolt is in place, with its curved portion engaging the curved surface of the stuffing-box $f$, the screwing up of the nut $m$ will draw said bolt tighter around said gland and bind or lock it securely in place. It is apparent that instead of having the curved portion $i^2$ of the bolt $i$ smooth to conform to the smooth portion of the gland $f$ said curved portion $i^2$ may be threaded, so as to engage the threads on said gland. In this case the threaded portion of said gland would be increased.

An ordinary spring nut-lock washer $n$ is interposed between the nut $m$ and the shell $e$ to prevent the unscrewing of said nut due to the vibration of the machine when in operation. A supplemental bushing $o$ is contained within the shell $e$, said bushing being also made in two parts connected by ordinary dowel-pins passing through openings $o'$. The annular flange $o^2$ of the bushing $o$ engages the shoulder $r$ within the shell $e$, whereby the upward movement of the bushing $o$ is controlled.

The lower end of the bushing $o$ is beveled or countersunk, as at $s$, while the gland $f$ has the beveled shoulder $s'$. The packing, whether compressible or one of the compositions of metals used for this purpose, is interposed between the beveled end $s$ of the bushing $o$ and the beveled shoulder $s'$ of the gland $f$. As the bushing $f$ is screwed up into the shell $e$ the packing is compressed. This compression can always be maintained by screwing up the gland $f$ from time to time; but when the upper end of said gland comes in contact with the flange $o^2$ of the bushing $o$ then the packing must be renewed.

As the gland $f$ is made in two parts, it can be readily adjusted around the piston-rod $t$, and when it is desired to remove the packing or inspect the same it is only necessary to unscrew the gland $f$ and withdraw it from the shell $e$, together with the packing contained within said gland. By removing one-half of the gland the packing is then exposed and may be turned on the piston-rod to present all points for inspection to see if it is free from foreign substances. This is of special importance where steam is used as the motive power, and this invention is especially adapted for such use, although we do not wish to limit it to any specific use.

At the upper end of the shell $e$ is the upper bushing $u$, which rests against the shoulder $u'$ in said shell. The upper portion of the bushing $u$ extends into the cylinder $a$, and said bushing has the Babbitt lining $u^2$, which presents a smooth even surface to the piston-rod.

Suitable packing $v$ may be interposed between the shoulder $v'$ on the bushing $u$ and the lower end of the cylinder. This construction is claimed in a separate application filed by us of even date herewith, Serial No. 721,214.

What we claim as our invention, and desire to secure by Letters Patent, is—

1. In a cylinder-head for rock-drills, a bushing contained within the shell of said head, a partible gland extending into the shell and over the bushing, said gland having a shoulder between which and the end of the bushing the packing is interposed, and means for adjustably securing the gland in the shell of the head.

2. In a cylinder-head for rock-drills, said head comprising a shell provided with interior screw-threads, a bushing contained within the shell, a partible gland extending into the shell and over the bushing, said gland having exterior screw-threads for engaging the interior screw-threads of the shell and an internal shoulder between which and the end of the bushing the packing is interposed.

3. In a cylinder-head for rock-drills, said head comprising a shell provided with interior screw-threads and a shoulder, a bushing contained within the shell and having a shoulder engaging the shoulder of the shell, a partible gland extending into the shell and over the bushing, said gland having exterior screw-threads for engaging the interior screw-threads of the shell, and an internal shoulder between which and the end of the bushing the packing is interposed.

In testimony whereof we, the said ALBERT BALL and THOMAS OFFICER, have hereunto set our hands.

ALBERT BALL.
THOMAS OFFICER.

Witnesses:
GEO. E. WOLCOTT,
JOHN H. COSSITT.